United States Patent
Tsubouchi et al.

(10) Patent No.: US 6,311,606 B1
(45) Date of Patent: Nov. 6, 2001

(54) VACUUM SERVO UNIT FOR VEHICLE BRAKE SYSTEMS

(75) Inventors: Kaoru Tsubouchi, Toyota; Akihiko Miwa, Anjo, both of (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/409,286

(22) Filed: Sep. 30, 1999

(30) Foreign Application Priority Data

Sep. 30, 1998 (JP) .................................................. 10-278402

(51) Int. Cl.[7] ..................................................... B60T 13/62
(52) U.S. Cl. ............................................................. 91/367
(58) Field of Search ................................. 91/367, 369.2; 303/3

(56) References Cited

U.S. PATENT DOCUMENTS

| 5,493,946 | 2/1996 | Schlüter ................................... 91/367 |
| 5,845,556 | * 12/1998 | Tsubouchi et al. ..................... 91/367 |
| 5,857,399 | 1/1999 | Tsubouchi et al. .................. 91/369.1 |
| 5,943,938 | * 8/1999 | Okuno et al. ........................ 91/369.2 |
| 6,082,241 | * 7/2000 | Kobayashi et al. ..................... 91/367 |
| 6,119,577 | * 9/2000 | Takasaki et al. ........................ 91/367 |
| 6,135,007 | * 10/2000 | Tsubouchi ............................ 91/369.2 |

FOREIGN PATENT DOCUMENTS

| 44 41 910 | * 5/1996 | (DE) . |
| 44 41 913 | * 5/1996 | (DE) . |
| 199 35 876 | * 3/2000 | (DE) . |
| 10-44971 | 2/1998 | (JP) . |
| 98/14358 | * 4/1998 | (WO) . |

* cited by examiner

Primary Examiner—John E. Ryznic
(74) Attorney, Agent, or Firm—Burns, Doane, Swecker & Mathis, LLP

(57) ABSTRACT

A vacuum servo unit or booster for a vehicle brake system includes a housing, movable walls disposed in the housing, a power piston, an input member, an atmospheric pressure valve seat, a negative pressure valve seat, a control valve having an atmospheric pressure seal portion and a negative pressure seal portion, an output rod, a reaction disc, and an actuator. The vacuum servo booster is designed so that the force produced from the output rod varies with the driving force of the actuator upon activation of the actuator.

15 Claims, 6 Drawing Sheets

VACUUM SERVO UNIT FOR VEHICLE BRAKE SYSTEMS

This application is based on and claims priority under 35 U.S.C. § 119 with respect to Japanese Application No. 10(1998)-278402 filed on Sep. 30, 1998, the entire content of which is incorporated herein by reference.

FIELD OF THE INVENTION

The present invention generally relates to vehicle brake systems. More particularly, the present invention pertains to a vacuum servo unit for a vehicle brake system.

BACKGROUND OF THE INVENTION

It is known that an automatic brake operation is established for purposes of preventing slip of the road-wheels of a vehicle when a rapid acceleration is made. An inter-vehicle distance control also utilizes such an automatic brake operation.

A known vacuum servo unit or booster is disclosed in, for example, U.S. Pat. No. 5,493,946 granted to Schluter. In this disclosed vacuum servo unit, automatic brake operation is established by introducing atmospheric pressure into a variable chamber by opening a valve. The valve is associated with a solenoid and energizing the solenoid causes atmosphere to be introduced into the variable chamber.

However, immediately upon fall opening of the valve, the vacuum servo unit outputs its maximum force. It is thus difficult in this known vacuum servo unit to establish a precise automatic braking operation based on the cause of the booster operation.

A need thus exists for a vacuum servo unit or booster that is not susceptible of the foregoing drawbacks and disadvantages.

SUMMARY OF THE INVENTION

According to one aspect of the invention, a vacuum servo unit for vehicle brake systems includes a housing in which is defined at least one pressure space, a movable wall provided in the housing for movement in an axial direction and dividing the pressure space into a front chamber and a rear chamber, a power piston coupled to the movable wall, an axially movable input member located in the power piston that is movable when an input force is applied by a brake operation member, an atmospheric pressure valve seat movable together with the input member, a negative pressure valve seat formed in the power piston, and a control valve. The control valve includes an atmospheric pressure seal portion and a negative pressure seal portion, with the atmospheric pressure seal portion interrupting fluid communication between the atmosphere and the rear chamber upon engagement with the atmospheric pressure valve seat and establishing fluid communication between the atmosphere and the rear chamber upon disengagement with the atmospheric pressure valve seat, and with the negative pressure seal portion interrupting fluid communication between the negative pressure source and the rear chamber upon engagement with the negative pressure valve seat and establishing fluid communication between the negative pressure source and the rear chamber upon disengagement from the negative pressure valve seat. An output member outputs an advancing force of the power piston outside the housing upon being advanced by the power piston, and a reaction member transmits the advancing force of the power piston and the input force applied to the input member to the output member, with the reaction member providing a reaction force corresponding to the force outputted from the output rod to retract the input member. An actuator provides the advancing force to the power piston by disengaging the atmospheric pressure valve seat from the atmospheric pressure seal portion to cause introduction of atmospheric pressure into the rear chamber. The input member includes a front portion engageable with the reaction member and a rear portion positioned at a rear side of the front portion and movable back and forth relative to the front portion, and the actuator is accommodated in the power piston so as to be movable back and forth. The actuator includes a movable portion engaged with the atmospheric pressure valve seat and engageable with the front portion of the input member, and a moving portion for moving the movable portion. As the actuator is driven, the reaction member retracts at least the front portion of the input member, the atmospheric pressure valve seat becomes engaged with the atmospheric pressure seal portion, and the output force depends on a driving force of the actuator.

According to another aspect of the invention, a vacuum servo unit for vehicle brake systems includes a housing in which is defined at least one pressure space, a movable wall provided in the housing for movement in an axial direction and dividing the pressure space into first and second chambers, a power piston coupled to the movable wall, an axially movable input member located in the power piston and connectable to a brake operation member to be moved upon application of an input force to the brake operation member, a valve mechanism located in the power piston to control pressure within one of said first and second chambers to cause the movable wall to move and thereby apply an advancing force to the power piston, an output member outputting the advancing force applied to the power piston outside the housing, and a deformable reaction member transmitting the advancing force of the power piston and the input force applied to the input member to the output member. The reaction member provides a reaction force corresponding to the force outputted from the output rod to retract the input member. An actuator is connected to the valve mechanism to operate the valve mechanism upon operation of the actuator in a manner causing application of the advancing force to the power piston, and a compressible member is located within the power piston and compressible during operation of the actuator to compensate for temperature changes affecting a degree of deformation of the reaction member.

According to a further aspect of the invention, a vacuum servo unit for vehicle brake systems includes a housing in which is defined at least one pressure space, a movable wall provided in the housing for movement in an axial direction and dividing the pressure space into first and second chambers, a power piston coupled to the movable wall, an axially movable input member located in the power piston and connectable to a brake operation member to be moved upon application of an input force to the brake operation member, a valve mechanism located in the power piston to control pressure within one of said first and second chambers to cause the movable wall to move and thereby apply an advancing force to the power piston, an output member outputting the advancing force applied to the power piston outside the housing, and a deformable reaction member transmitting the advancing force of the power piston and the input force applied to the input member to the output member. The valve mechanism includes an atmospheric pressure valve seat and an atmospheric pressure seal portion that are adapted to engage one another and the reaction member provides a reaction force corresponding to the force outputted from the output rod to retract the input member. An actuator is connected to the valve mechanism to operate the valve mechanism upon operation of the actuator in a manner causing application of the advancing force to the power piston. The input member has an engaging portion for directly engaging the reaction member, and the distance between the engaging portion and the atmospheric pressure valve seat during operation of the actuator varying depending on the driving force of the actuator.

BRIEF DESCRIPTION OF THE DRAWING FIGURES

The above and other features and characteristics associated with the present invention will become more apparent from the following detailed description considered with reference to the accompanying drawing figures in which like elements are designated by like reference numerals and wherein.

DETAILED DESCRIPTION OF THE PREFERRED EMBODIMENT

Figure 1:
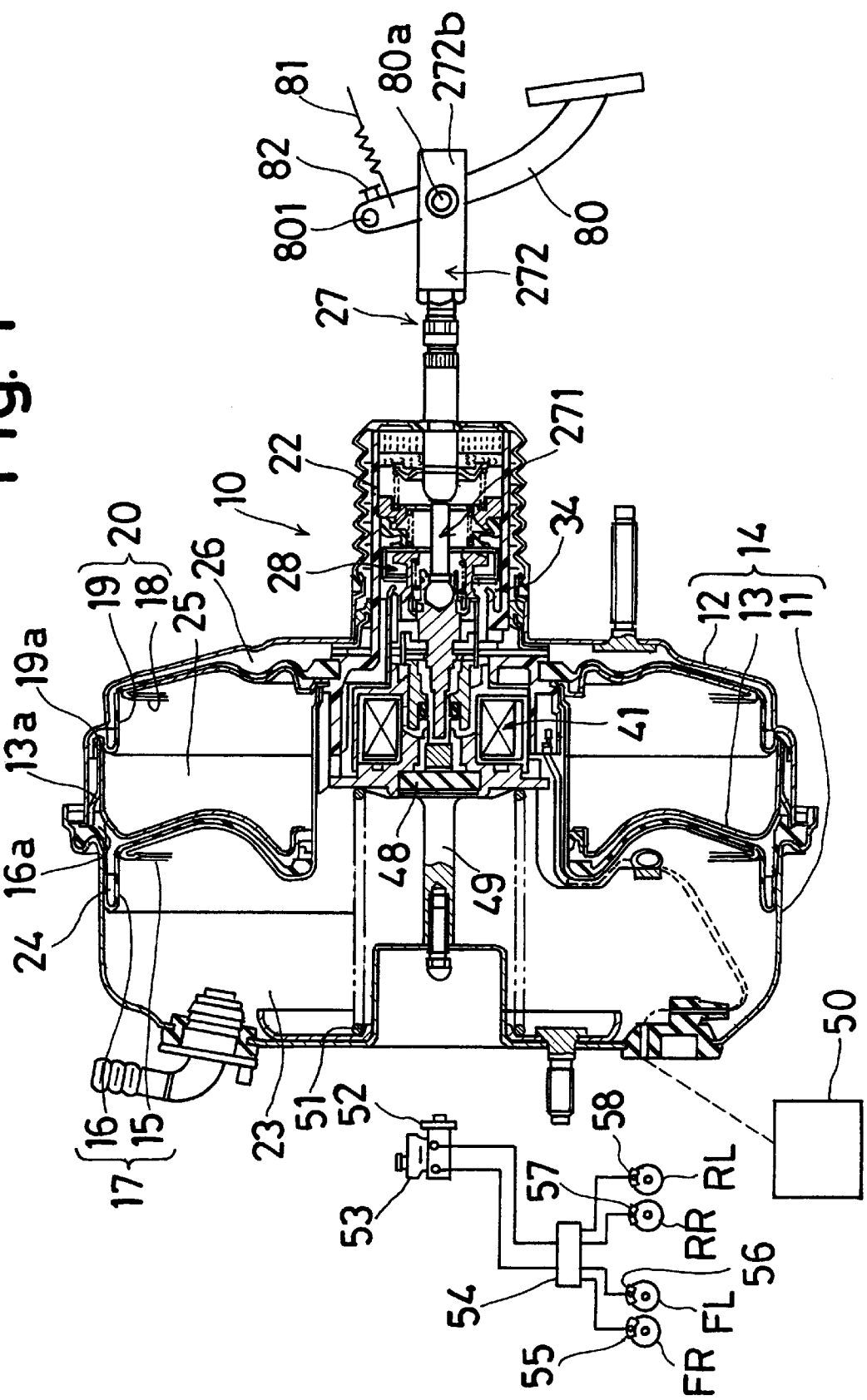
FIG. 1 is a cross-sectional view of a vacuum servo unit in accordance with an embodiment of the present invention.
Figure 2:
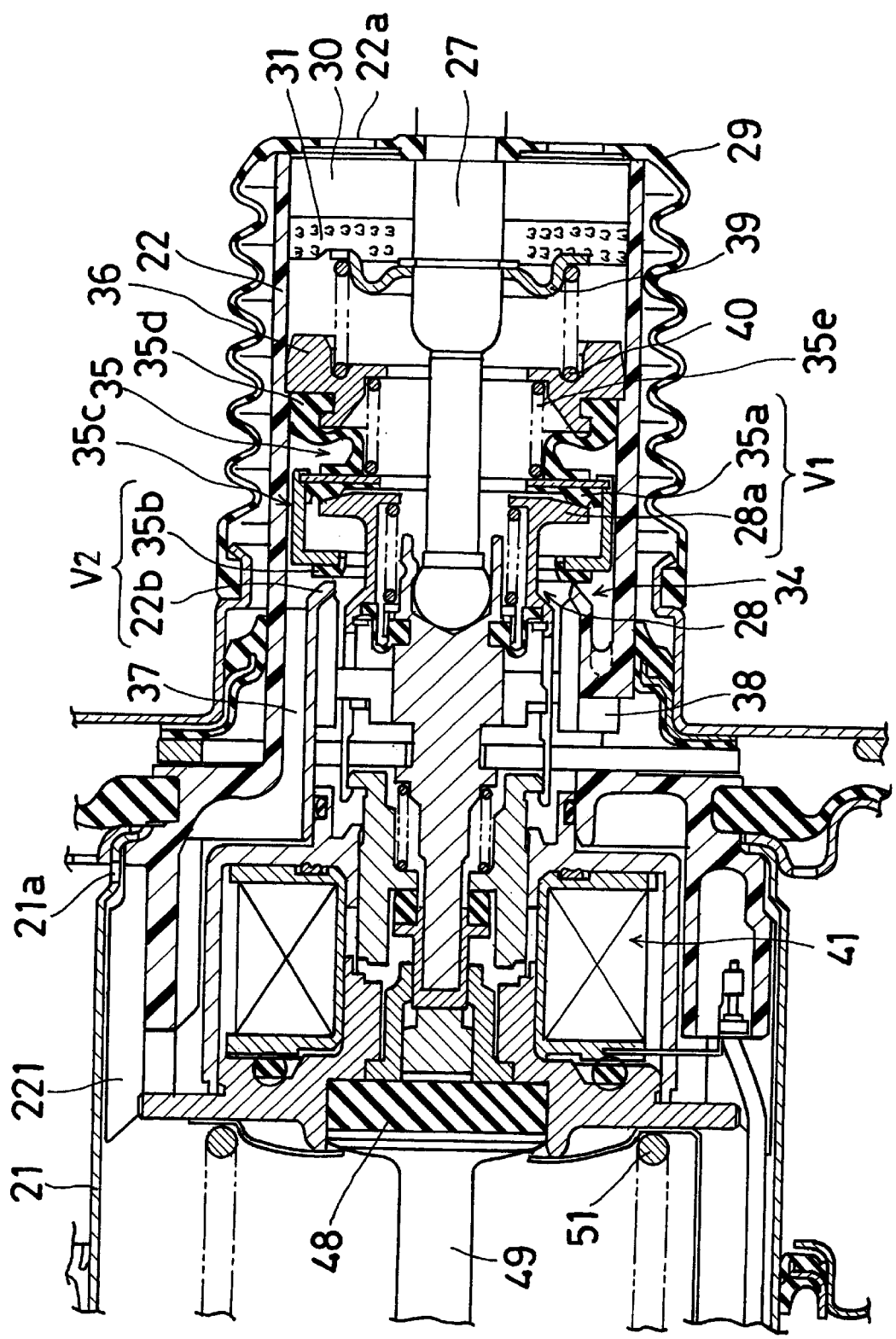
FIG. 2 is an enlarged cross-sectional view of the valve mechanism portion of the vacuum servo unit shown in FIG. 1.
Figure 3:
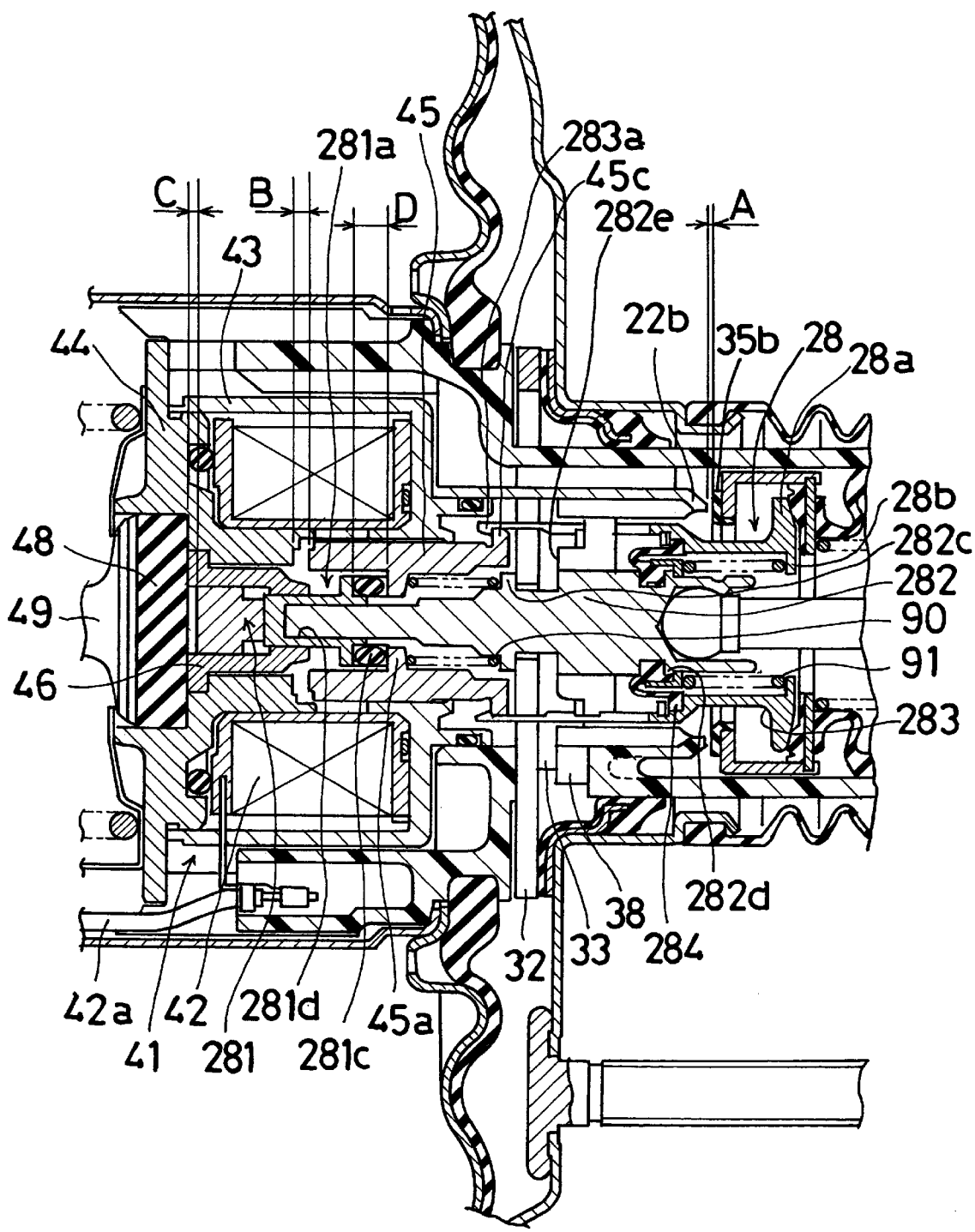
FIG. 3 is an enlarged cross-sectional view of the actuator portion of the vacuum servo unit shown in FIG. 1.

Referring first to FIGS. 1 to 3, the tandem type vacuum servo unit 10 for use in a vehicle brake system in accordance with the present invention includes a housing 14 having a front shell 11, a rear shell 12, and a dividing member 13 interposed between the front shell 11 and the rear shell 12. The dividing member 3 divides the interior of the housing 14 into a front side pressure chamber and a rear side pressure chamber.

Disposed within the front side pressure chamber of the housing 14 is a front side wall 17 comprised of a metal plate 15 and a rubber diaphragm 16. The front side wall 17 is axially movable back and forth within the housing 14. Positioned within the rear side pressure chamber of the housing 14 is a rear side wall 20 comprised of a metal plate 18 and a rubber diaphragm 19. The rear side wall 20 is axially movable back and forth within the housing 14.

The center portion of the metal plate 15 is provided with an integral axially extending cylindrical portion 21 which passes through a center portion of the dividing member 13 in a slidable and fluid-tight manner. The inner periphery of the diaphragm 16 is in the form of a bead configuration and is secured to the outer surface of the front end portion of the cylindrical portion 21 of the metal plate 15 in a fluid-tight manner. The outer periphery of the diaphragm 16, which is also in the form of a bead configuration, and the outer peripheral portion of the dividing member 13 are held in a fluid-tight manner between the outer peripheries of the front and rear shells 11, 12.

The outer periphery of the rear side diaphragm 19 is in the form of a bead configuration and is held in a fluid-tight manner between a stepped portion of the rear shell 12, which is located near the outer periphery of the rear shell 12, and a folded portion located at the outer periphery of the dividing member 13.

The outer surface of the front side portion of a power piston 22 passes through a rear opening of the rear shell 12 in a slidable and fluid-tight manner. The outer surface of the front side portion of the power piston 22 is also connected to the rear end portion of the cylindrical portion 21 of the metal plate 15, the inner periphery of the rear plate 18, and the inner periphery of the rear side diaphragm 19 which is in the form of a bead portion.

The foregoing arrangement defines a first front chamber 23 and a first rear chamber 24 in the front side pressure chamber of the housing 14, and a second front chamber 25 and a second rear chamber 26 in the rear side pressure chamber of the housing 14. The first front chamber 23 is held at a negative pressure by being continually connected to a negative pressure or vacuum source which can be in the form of the engine intake manifold. The second front chamber 25 is also kept at the negative pressure by being in continual fluid communication with the first front chamber 23 via a hole 21a in the cylinder portion 21 of the front plate 15 and a groove 221 formed in the outer surface of the front side portion of the power piston 22.

The first rear chamber 24 is in fluid communication with the second rear chamber 26 via a groove 16a formed in the inner surface of the bead-shaped outer periphery of the front side diaphragm 16, a hole 13a formed in the dividing member 13, and a groove 19a formed in the bead-shaped outer periphery of the rear side diaphragm 19.

Positioned within the power piston 22 is an input rod 27 that is axially movable back and forth relative to the power piston 22. The input rod 27 has a front portion 271 which is connected to an input member 28 at a ball joint connection. The input member 28 is accommodated in the in the power piston 22 so as to be axially movable back and forth (i.e., in the right-left direction in FIG. 1). The rear end of the input rod 27 is connected to a brake pedal 80 after passing through a wall which defining the engine compartment.

As best shown in FIG. 2, a filter 30 and a sound-absorbing member 31 are positioned in a rear opening of the power piston 22. The inner space of the power piston is in fluid communication with the outside space or atmosphere via the sound-absorbing member 31 and the filter 30.

The input member 28 includes a first member 281, a second member 282, and a third member 283. The first member 281 is located within a frontward side (i.e., the left side in FIG. 3) of the power piston 22 and is adapted to be in abutment with the rear side of a reaction disc 48. The second input member 282 is positioned to the rearward side of the first input member 281, is positioned coaxially with the first input member 281 and is connected to the input rod 27. The third input member 283 is cylindrically shaped and has an atmospheric valve seat 28a at its rear end portion. The third input member 283 is generally positioned around the second input member 282.

The third input member 283 is coaxially disposed with the second input member 282 and is movable in the axial direction relative to the second input member 282. A flexible diaphragm 284 is positioned between the outer surface of the second input member 282 and the inner surface of the third input member 283 to establish a fluid tight connection between the second input member 282 and the third input member 283. The diaphragm 284 is retained in a groove 282d formed near the rear portion of the second input member 282 and is retained at the forward portion of the third input member 283 as shown in FIG. 3.

The rear portion of the first input member 281 has a concave portion 281d which opens rearwardly and the front end portion of the second input member 282 is slidably fitted in this concave portion 281d of the first input member 281 for back and forth movement. Thus, the first input member 281 is movable relative to the second input member 282. Under the initial state as shown in FIG. 3, the bottom of the concave portion 281d of the first input member 281 is in engagement with the front end of the second input member 282.

The power piston 22 is provided with a radially extending key member 32 for regulating or defining the front limit and the rear limit of the input member 28 which is movable relative to the power piston 22. The key member 32 passes through a hole 33 formed in the power piston 22 and is hooked or otherwise connected to the power piston 22 so that the key member 32 does not fall or from the power piston 22.

A valve mechanism 34 is positioned within the power piston 22. This valve mechanism 34 establishes, depending on the axial position or displacement of the input member 28 relative to the power piston 22, an output force decrease condition, an output force maintaining condition, or an output force increasing condition. Under the output force decreasing condition, the second rear chamber 26 is in fluid communication with the first front chamber 23, with both chambers being isolated from the atmosphere. Under the output force maintaining condition, the second rear chamber 26 is isolated from the first front chamber 23 and is also isolated from the atmosphere. Under the output force increasing condition, the second rear chamber 26 is in communication with the atmosphere while being isolated from the first front chamber 23.

The valve mechanism 34 includes a first or atmospheric pressure valve seat 28a, a second or negative pressure valve seat 22b, and a control valve 35. The first valve seat 28a possess an annular or ring shaped configuration on the second input member 282 and is oriented in the rearward direction or the rightward direction in FIG. 3. The second valve seat 22b is integrally formed on the power piston 22 and is oriented in the rearward direction. The control valve 35 has an atmospheric pressure sealing portion 35a which opposes the first valve seat 28a to be engaged with or disengaged from the first valve seat 28a, and a negative pressure sealing portion 35b which opposes the second valve seat 22b to be engaged with or disengaged from the second valve seat 22b. The sealing portions 35a, 35b form substantially ring shaped structures.

As shown in FIGS. 2 and 3, the control valve 35 includes a movable portion 35c which is integral with the sealing portions 35a, 35b, a stationary portion 35d secured to the power piston 22 in a fluid-tight manner by a retainer 36, and a valve spring 35e which urges the movable portion 35c in the frontward direction.

In the valve mechanism 34, the sealing portion 35a and the atmosphere valve seat 28a constitute an atmospheric pressure valve V1, while the sealing portion 35b and the negative valve seat 22b constitute a negative pressure valve V2.

As shown in FIG. 2, a vacuum passage 37 and an air passage 38 are formed in the power piston 22. The vacuum passage 37 connects the negative pressure valve V2 of the valve mechanism 34 to the first front chamber 23, while the air passage 38 connects the atmospheric pressure valve V1 of the valve mechanism 34 to the second rear chamber 26. The stationary portion 35d within the power piston 22 is in fluid communication with the atmosphere via the sound-absorbing member 31, the filter 30, and the rear opening 22a of the power piston 22.

When the valve seat 28a of the atmospheric pressure valve V1 is engaged with the sealing portion 35a, the second rear chamber 26 is isolated from the atmosphere and when the valve seat 28a of the atmospheric pressure valve V1 is disengaged from the sealing portion 35a, the second rear chamber 26 communicates with the atmosphere. When the valve seat 22b of the negative pressure valve V2 is engaged with the sealing portion 35b, fluid communication between the first front chamber 23 and the second rear chamber 26 is interrupted and when the valve seat 22b of the negative pressure valve V2 is disengaged from the sealing portion 35b, fluid communication between the first front chamber 23 and the second rear chamber 26 is established.

A spring 40 is interposed between the retainer 36 and another retainer 39 which is mounted on the front portion 271 of the input rod 27. This spring 40 urges the input rod 27 and the input member 28 in the rearward direction to establish a continual condition under which the atmospheric pressure valve seat 28a is engaged with the sealing portion 35a and the negative pressure valve seat 22b is out of engagement with the sealing portion 35b when the brake pedal 80 is not depressed or the initial stage as shown in FIGS. 2 and 3 is maintained. It is to be noted that under such initial stage, a gap or clearance A (FIG. 3) exists between the negative pressure valve seat 22b and the sealing portion 35b.

As shown in FIG. 3, an actuator 41 is accommodated inside the front portion of the power piston 22. The actuator 41 includes or is made up of a solenoid coil 42, a yoke 43 formed of a magnetic material, a stationary core 44 formed of a magnetic material, and a movable core 45 formed of a magnetic material.

The movable core 45 is provided around the input member 28 so as to be movable in the axial direction (i.e., the horizontal direction in FIG. 3) relative to the power piston 22 and the input member 28. More specifically, the movable core 45 is located at the front side of the third input member 283 and generally coincides in axial positioning with the rear portion of the first member 281 and the front portion of the second input member 282. The movable core 45 possesses a substantially cylindrical shape and has a radially inwardly directed inward flange 45a and a radially outwardly directed outward flange 45c at its intermediate and rear portions, respectively.

The rear portion of the first member 281 of the input member 28 is formed with an engaging portion 281a which engages the first inward flange 45a of the movable core 45. The engaging portion 281a has a radially outwardly directed outward flange extending from its rear opening, and the rear side of this outward flange is integrally provided with an annular rubber member 281c.

The rubber member 281c is adapted to be deformed in the axial direction and thus deforms whenever the movable core 45 advances. The rubber member 281c has an axial length or thickness of D. In addition, the rubber member 281c possesses characteristics by which its elasticity changes according to the environment or ambient temperature and/or its own temperature. More specifically, the rubber member 281c is relatively easily deformed at a normal temperature ranging from 20° C. to 25° C., but is more difficult to deform at a lower temperature ranging from −25° C. to −30° C. Thus, the degree of deformation of the rubber member 281c in lower temperatures is smaller than that in normal temperatures.

The third input member 282 has a front and portion 283a which engages the outer flange 45c of the movable core 45 as seen in FIG. 3.

The mid portion of the second member 282 has a radially outwardly directed outward flange 282c. A spring 90 is interposed between this outward flange 282c of the second member 282 and the inward flange 45a of the movable core 45. This spring 90 urges the movable core 45 in the frontward direction.

A spring 91 is also interposed between a retainer supporting the diaphragm of the third member 283 and the inward flange 282b of the second member 282. This spring 91 urges the third member 283 in the rearward direction. The urging force of the spring 91 is set to be not greater than that of the spring 90.

Thus, the movable core 45 is movable back and forth together with the power piston 22. The guide member 46 supports the axial movement or back-and-forth sliding movement of the first member 281.

The solenoid coil 42 is positioned around the movable core 45. The solenoid coil 42, the yoke 43, and the stationary core 44 are fixedly mounted on the power piston 22. The solenoid coil 42 is electrically coupled via a pair of lead wires 42a to an electronic control device 50 positioned outside the housing 14.

While the solenoid coil 42 is de-energized to define an inactive condition of the actuator 41, a clearance is set between the front side of the movable core 45 and the stationary core 44.

If the solenoid coil 42 is energized for activating the actuator 41, a magnetic attraction force is generated between the stationary core 44 and the movable core 45, thereby moving the movable core 45 in the frontward or forward direction. The maximum stroke of the movable core 45 corresponds to the clearance B between the stationary core 44 and the movable core 45 shown in FIG. 3.

A rubber reaction disc 48 in the general form of a substantially circular plate is provided in a larger portion of the stepped bore in the front side of the stationary core 44. At the front side of the reaction disc 48, the large portion of the stepped bore of the stationary core 44 slidably receives an output rod 49 which passes through a center of the front shell 11 of the housing 14 in a fluid-tight and slidable manner.

As is known, the reaction disc 48 is adapted to transmit promotion forces or forward forces from the respective power piston 22 and the input member 28 to the output rod 49, and to provide a reaction force equivalent to the output force derived from the output rod 49 to the input member 28 for retracting movement thereof. Thus, the reaction disc 48 provides a reaction force which is equivalent to the output force derived from the output rod 49. In addition, like the rubber member 281c of the input member 281, the reaction disc 44 changes its characteristics according to changes in the temperature. The rubber member 281c is relatively easily deformed at a normal temperature ranging between 20° C. and 25° C., but is relatively difficult to deform at a lower temperature ranging from −25° C. to −30° C. Thus, the degree of deformation at lower temperatures is smaller than that in normal temperatures.

Under the initial state, a clearance C is defined between the rear end of the reaction disc 48 and the central part of the front end of the first member 281 of the input member 28.

As shown in FIG. 1, the brake pedal 80 is urged by a return spring 81 to be rotated about a pivot 801 in the counterclockwise direction and is brought into engagement with a stopper 82. Such a position of the brake pedal 80 is defined as its initial position.

So long as the solenoid coil 42 is not energized thus resulting in the non-operating condition of the actuator 41, a clearance is defined between the front end of the movable core 45 and the rear end of the stationary core 44.

Upon energization of the solenoid coil 42, the actuator 41 is brought into operation, and an electromagnetic attraction force is generated between the cores 44 and 45, thus moving the movable core 45 in the frontward or forward direction. The maximum stroke of the movable core 45 corresponds to the distance between the stationary core 44 and the movable core 45 in FIG. 9.

A return spring 51 is provided at the central portion of the first front chamber 23. This return spring 51 retracts the power piston 22 and both of the movable walls 17, 20 which are connected thereto relative to the housing 14.

The output rod 49 is associated with a piston of a master cylinder 52 on which a reservoir tank 53 is mounted. The master cylinder 52 is connected via piping to an actuator division 54 for an ABS (Antilock Brake System), a TRC (Traction Control), and/or a brake-steering control such as VSC. The actuator division 54 is in fluid connection with wheel cylinders 54, 55, 56, 57 provided on rotating wheels PR, FL, RR, RL respectively of the vehicle.

Figure 4:
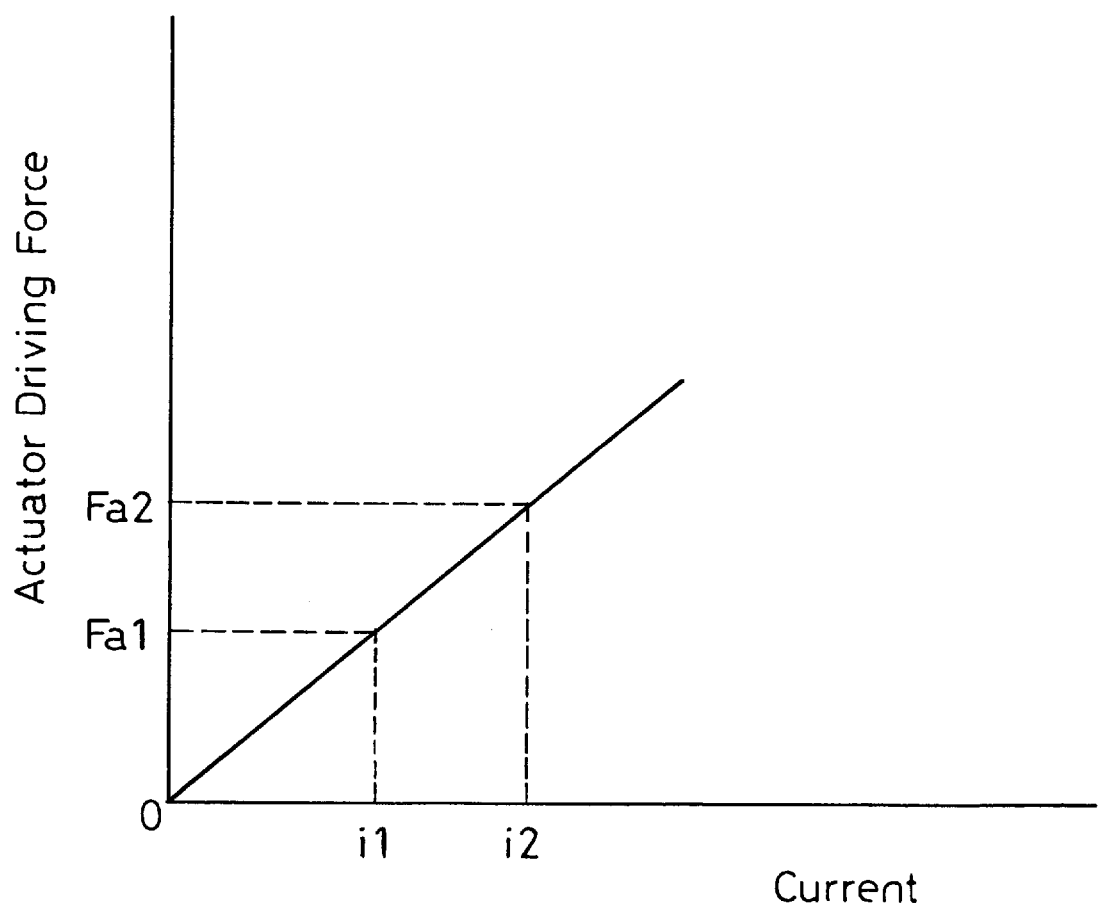
FIG. 4 is a characteristic graph showing the relationship between the current applied to the actuator and the resulting driving force associated with the vacuum servo unit of the present invention.

As shown in FIG. 4, which illustrates the relationship between a current i flowing through the solenoid coil 42 of the vacuum servo unit 10 and a driving force derived from the actuator 41, with an amount i1 (i2) of current flowing through the solenoid coil 42, an amount F1 (F2) of driving force can be derived from the actuator 41.

The following is explanation of the operation of the vacuum servo unit 10. FIGS. 1 through 3 depict the condition of the unit when the brake pedal 80 is not depressed, the actuator 41 is inactive, and the valve mechanism 34 is in the output decreasing condition under which fluid communication is established between the second rear chamber 26 and the first front chamber 23 while the chamber 26 is isolated from the atmosphere. In this condition, the valve seat 28a is in engagement with the sealing portion 35a, while the valve seat 22b is out of engagement with the sealing portion 35b. Thus, the pressure in the first rear chamber 24 and the pressure in the second rear chamber 26 is the same as the pressure in the first front chamber 23. Consequently, a movement force is not applied to each of the movable walls 17, 20 and the power piston 22, and so these members 17, 20, 22 are held at the retracted positions, respectively, by the return spring 51.

Figure 5:
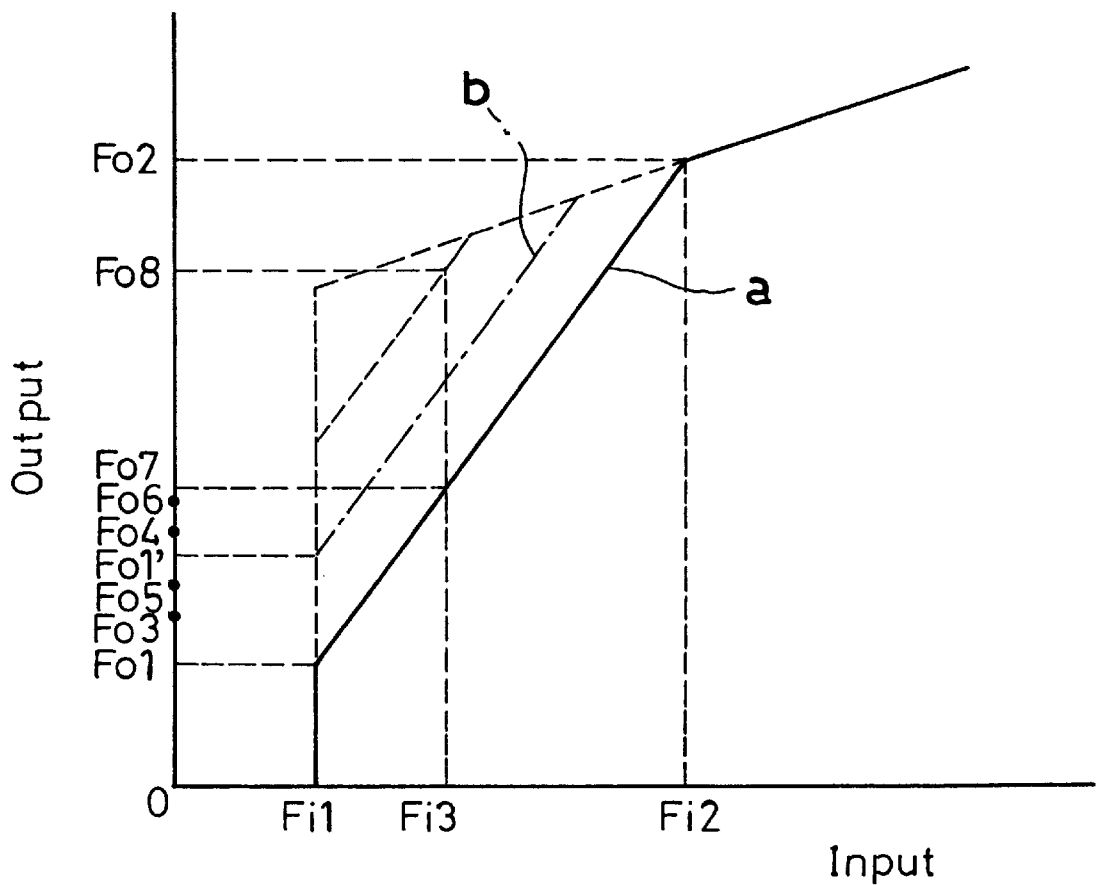
FIG. 5 is a characteristic graph of the input/output of the vacuum servo unit shown in FIG. 1.

FIG. 5 indicates the characteristics of the vacuum servo motor 10 in accordance with the present invention, where the x-axis denotes the input force and the y-axis denotes the output force. As mentioned above, under ambient temperature conditions where the own temperature of the reaction disc 48 and the own temperature of the rubber member 281c are within the normal temperature ranging, for example, from 20° C. to 25° C., if the driver depresses the brake pedal 80 at a pressure or an input force F1 for normal brake operation, the input rod 27 advances relative to the power piston 22.

The input rod 27 causes a concurrent advancing movement of the second member 282 of the input member 28. Due to the fact that the bottom of the concave portion 281d of the first member 281 is urged by the front end of the second member 282, the second member 282 and the first member 281 which constitute the input member 28 advance together with the input rod 27.

In addition, due to the fact that the movable core 45 is urged by the second input member 282 via the spring 90 along with the advancing movement of the second input member 282, the movable core 45 and the third input member 283 engaged therewith are also advanced. That is, the input member 28, the movable core 45, and the input rod 27 advance as a unit.

As the input member 28 advances, the movable portion 35c of the control valve 35 also advances by the frontward urging force of the valve spring 35e. This causes an engagement of the negative pressure sealing portion 35b of the control valve 35 with the negative pressure valve seat 22b of the power piston 22, thus closing the negative pressure valve V2. At this time, the clearance between the rear side of the reaction disc 48 and the front end portion of the first input member 281 of the input member 28 becomes a distance of (C−A).

Immediately upon closure of the negative pressure valve V2, the fluid communication between the vacuum passage 37 and the air passage 38 is interrupted, thereby isolating the second rear chamber 26 from the first front chamber 23. Thus, the valve mechanism 34 is switched from the output decreasing mode to the output maintaining mode.

Under the resultant condition, if the input rod 27 and the input member 28 are further advanced by a distance of α, the atmospheric pressure valve seat 28a of the input member 28 is moved away from the atmospheric pressure sealing portion 35a by a distance of α, thereby opening the atmospheric pressure valve V1. At this time, the clearance between the rear side of the reaction disc 48 and the front end portion of the first input member 281 of the input member 28 becomes a distance of (C−A−α).

With this opening of the atmospheric pressure valve V1, the air passage 38 is brought into fluid communication with the atmosphere via the clearance between the valve seat 28a and the seal portion 35a, the inside of the control valve 35 in the power piston 22, the sound-absorbing member 31, the filter 30, and the rear opening 22a of the power piston 22, thus causing an introduction of air into the second rear chamber 26 and thereby switching the valve mechanism 34 into the output increase mode.

The air introduced into the second rear chamber 26 flows further into the first rear chamber 24, thereby increasing the pressure in the respective rear chambers 24, 26. Thus, a promoting force is generated across the first movable wall 17 due to the pressure difference between the first front chamber 23 and the first rear chamber 24, a promoting force is generated across the second movable wall 20 due to the pressure difference between the second front chamber 25 and the second rear chamber 26, and a promoting force is generated across the power piston 22 due to the pressure difference between the first front chamber 23 and the second rear chamber 26.

The sum of these promoting forces is transmitted from the power piston 22 to the output rod 49 via the stationary core 44 of the actuator 41 and the reaction disc 48, the walls 17, 20, the power piston 22 and the output rod 49 begin to advance as one unit relative to the housing 14, whereupon the master cylinder 52 is activated.

At this time, the power piston 22 also advances relative to the input member 28, thereby moving the atmospheric pressure sealing portion 35a of the control valve 35 to the atmospheric pressure valve seat 28a. In addition, the reaction disc 48 extends into the hole in the guide member 46 after being deformed in the rearward direction due to the compression of the reaction disc 48 by the power piston 22 and the output rod 49. Such a deformed extension of the reaction disc 48 is used to compensate the clearance (C−A−α) between the reaction disc 48 and the input member 28 at the time when the seat valve 28a is moved away from the sealing portion 35a and a newly established clearance between the reaction disc 48 and the input member 28 due to the advancing movement of the power piston 22 relative to the input member 28 when the valve mechanism 35 is transferred to the output increasing mode.

The advancing movement of the power piston 22 causes later a re-engagement of the atmospheric pressure sealing portion 35a of the control valve 35 with the atmospheric pressure valve seat 28a, with the result that the air passage 38 is isolated from the atmosphere, thereby stopping the entrance of air into both of the rear chambers 24, 26. The valve mechanism 34 is thus transferred to the output maintaining mode.

The retraction amount of the input member 28 relative to the power piston 22 during the transfer of the valve mechanism 34 from the output increasing mode to the output maintaining mode is approximately equal to the clearance A between the atmosphere valve seat 28a and the atmosphere seal portion 35a. The rearward extension amount of the reaction disc 48 is (C−A) during the transfer of the valve mechanism 34 from the output increasing mode to the output maintaining mode.

In addition, during the transfer of the valve mechanism 34 from the output increasing mode to the output maintaining mode, through the rearward extension of the reaction disc 48 which causes an engagement thereof with the front side of the input member 28, the reaction disc 48 applies a reaction force to the input member 28 corresponding to the output force from the output rod 49.

At this time, the input force applied from the brake pedal 80 to the input member 28 is Fi1 and the output force derived from the output rod 49 to the master cylinder 52 is Fo1, as shown in FIG. 5.

That is, a so-called "jumping operation" is made in such manner that the output value increases from zero to Fo1 in a direct manner while the input member 28 is applied with a constant input value Fi1 without being applied with a reaction force from the reaction disc 48.

Figure 6:
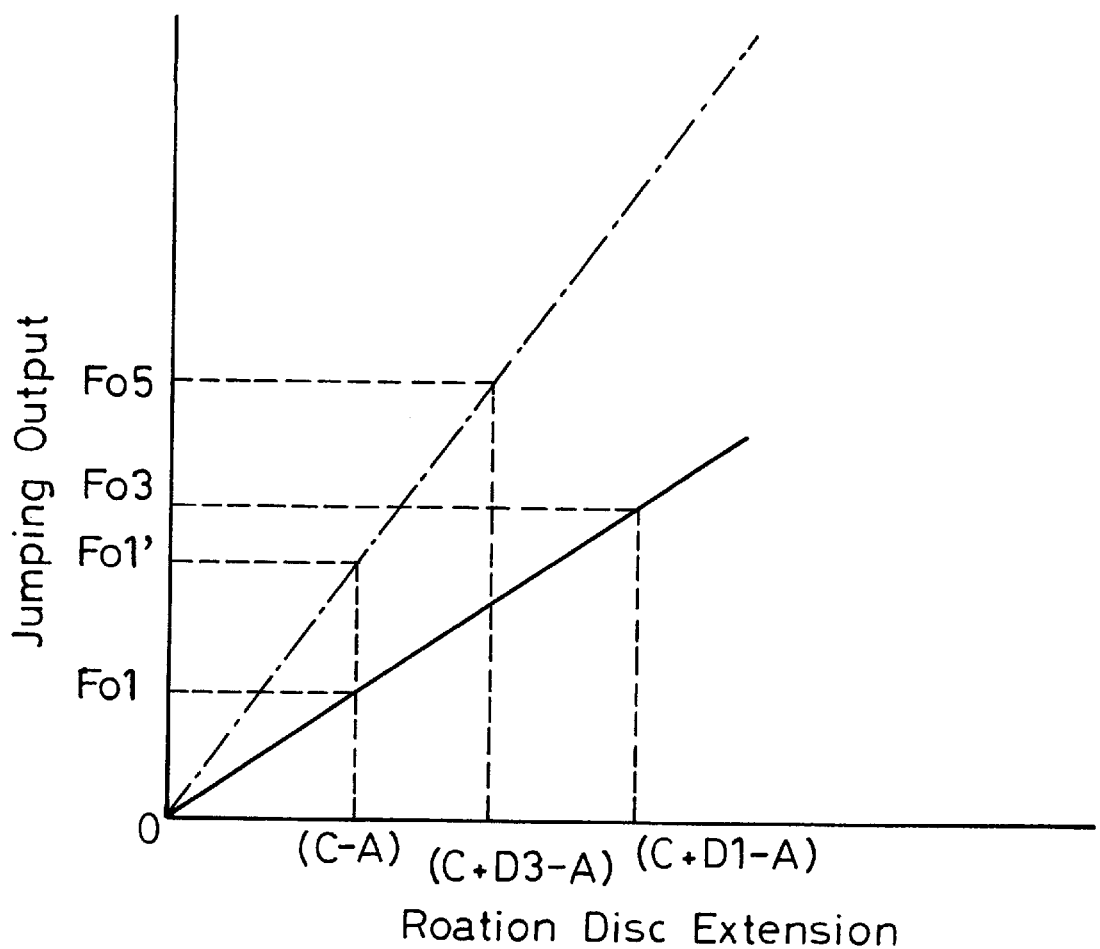
FIG. 6 is a characteristic graph showing the relationship between the degree of protrusion of the reaction disc and the jumping output.

With reference to FIG. 6 which shows a graph of the jumping characteristics. In this graph, the x-axis and the y-axis denote the rearward extension amount of the reaction disc 48 and the output force upon jumping operation, respectively. This graph indicates that the larger (smaller) the rearward extension amount of the reaction disc 48, the larger (smaller) the output force upon jumping operation.

Moreover, this jumping output depends on the elastic deformation characteristics of the reaction disc 48. Due to the fact that the amount or degree of elastic deformation of the reaction disk 48 changes according to its own temperature and the surrounding temperature, the rearward extension amount of the reaction disc 48 becomes smaller when the temperature is lower, within the range of, for example, −25° C. to −30° C. than when the temperature is normal, within the range of, for example, 20° C. to 25° C.

Thus, while the vacuum servo booster 10 is in the jumping operation mode, the required rearward extension amount of the reaction disc 48 for transferring the valve mechanism 34 from its output force increasing mode to its output maintaining mode is (C−A) and the required output force for generating the value (C–A) at the reaction disc 48 becomes larger in a lower temperature than in a normal temperature. In the normal and lower temperatures, such an output force follows the real line and phantom line indications in the graph in FIG. 6. For example, at a relatively lower temperature, with a force Fi1 applied to the brake pedal 80, the input rod 27, and the input member 28, the vacuum servo unit or booster 10 issues an output force Fo1'.

When the valve mechanism 34 is in the output force maintaining mode and the output force Fo1 is issued, when the input force applied by the driver from the brake pedal to the input member 28 is increased to a value less than Fi2 in FIG. 5, a unitary advancing movement of the first input member 281, the second input member 282, and the third input member 283, or an advancing movement of the input member 28, is made relative to the power piston 22. This causes the atmosphere valve seat 28a to move away from the atmospheric seal portion 35a of the control valve 35, whereby the atmospheric valve V1 is opened and the valve mechanism 34 is switched into its output force increasing mode. Thus, atmospheric air is introduced into both of the rear chambers 24, 26, which causes a pressure increase in each of the rear chambers 24, 26, resulting in the generation of the prompting or promoting force of each of the movable walls 17, 20 and the power piston 22. This thus establishes a further advancing movement of each of the movable walls 17, 20 and the power piston 22 relative to the housing 14.

The advancing movement of the power piston 22 relative to the input member 28 and the subsequent rearward movement of the input member 28 upon receiving the reaction force from the reaction disc 48 causes movement of the atmospheric pressure sealing portion 35a towards the atmospheric pressure valve seat 28a. Then, re-engagement between the atmospheric pressure sealing portion 35a towards the atmospheric pressure valve seat 28a is established, thereby closing the atmospheric pressure valve V1. That is, the introduction of air into each of the rear chambers 24, 26 is interrupted and the valve mechanism 34 is turned to the output maintaining mode. Thus, the increase of the promoting force of each of the movable walls 17, 20, and the power piston 22 is terminated.

At this time, the outputted force derived from the vacuum servo unit 10 follows a line "a" in FIG. 5.

Under the output maintaining mode of the valve mechanism 34, if the input force from the brake pedal 80 to the input member 28 increases to a value more than Fi1 for example, the input member 28 is retracted relative to the power piston 22 and with a resultant retracting movement of the movable portion 35c of the control valve 35 relative to the power piston 22, thus causing the negative pressure seal portion 35b to move away from the negative pressure valve seat 22b. The negative pressure valve V2 is thus opened and the valve mechanism 34 is switched into its output force decreasing mode.

Moving the negative pressure sealing portion 35b away from the negative pressure valve seat 22a establishes a fluid communication between the vacuum passage 37 and the air passage 38 via the clearance between the negative pressure sealing portion 35b and the negative pressure valve seat 22a. The pressure in the respective rear chambers 24, 26 is evacuated to the vacuum source via the first front chamber 23. Thus, the pressure in each of the rear chambers 24, 26 drops.

This brings about a decrease of the promoting force of each of the movable walls 17, 20 and the power piston 22, which causes a retraction of the each of the movable walls 17, 20, the power piston 22, and the output rod 49 relative to the housing 14. During such movements, the power piston 22 per se also retracts, which causes a movement of the negative pressure valve seat 22b toward the negative pressure sealing portion 35b, resulting in an engagement therebetween. Thus, the negative pressure valve V2 is closed, which causes an interruption of air movement into the first front chamber 23 from each of the rear chambers 24, 26. This means that the valve mechanism 34 is transferred to the output maintaining mode and the decrease of the prompting force of each of the movable walls 17, 20 and the power piston 22 is interrupted or stopped.

At this time, the output derived from the vacuum servo unit 10 follows the line "a" so long as the input ranges from Fi1 to Fi2 during normal braking operation in a normal temperature range.

When the value of the input is Fi2 in FIG. 5, the pressure in each of the rear chambers 24, 26 becomes equal to atmospheric pressure when the unit 10 is in the normal operation mode within normal temperatures. If the input ranges from Fi1 to Fi2, the changing degree of the force transmitted from the output rod 49 to the master cylinder 53 is larger than that of the force applied to the input member 28. The gradient of the line "a" defined by the ratio of the input to the output is in coincidence with the ratio of the abutting area between the rear side of the reaction disc 48 and the front side of the input member 28 to the area of the rear side of the reaction disc 48.

In FIG. 5, the graph shows that if the input is Fi2, the output becomes Fo2. In case of an increase of the input from Fi2, the resulting output increases correspondingly by the same increment. It is to be noted that the force change degree indicated in the graph by the unit y-distance is set to be larger than that indicated by the unit x-distance. If the unit x-distance and the y-distance are set to be equal in force change degree, the gradient of the line "a" becomes 45 degrees for input above Fi2.

With respect to the normal operation mode of the unit 10 in lower temperatures, so long as the input ranges from Fi1 to Fi2, the input-output characteristics of the unit 10 indicates that the jumping output is F11' and the inclination thereof is identical to that of the line "a".

While the temperature of the environment, the reaction disc 48, and the rubber member 281c are normal, if an inter-vehicle distance between a proceeding vehicle and a successive vehicle is found by a sensor mounted on the successive vehicle to be less than a set value, an automatic braking operation is established in which the actuator 41 is controlled by the electronic control device 50. In other words, during the automatic braking operation mode, no operations are made by the driver on the brake pedal 80, the input rod 17, and the input member 28, and under such a condition the actuator 41 is in operation.

When the electronic control device 50 supplies a current having a magnitude i1 to the solenoid coil 42, an attracting force is generated between the movable core 45 and the stationary core 44, thereby advancing the movable core 45 and the third input member 283 against the urging force of the spring 91 relative to the power piston 22 and the second input member 282. Due to such advancing movements of the movable core 45 and the third input member 283, the first input member 281 whose engaging portion 281a is in engagement with the first inward flange 45a of the movable core 45 is advanced relative to the power piston 22 and the second member 282.

Due to such an advancing movement of the movable core 45, the third input member 283, and the first input member 281 by C, the front end portion of the first input member 281 is brought into engagement with the rear side of the reaction disc 48. This means that the no clearance is formed or defined between the reaction disc 44 and the input member 28.

Due to the concurrent advancing movements of the movable core 45 and the input member 28, only the front portion 271 of the input rod 27 connected to the second member 282 of the input member 28 is advanced relative to the power piston 22. The rear portion 272 of the input rod 27 fails to follow the movement of the front portion 271 due to the fact that the rear portion 272 is held at its initial stage by the urging force of the return spring 81 via the brake pedal 80. That is, the movable core 45, the input member 28, and the front portion 271 of the input rod 27 are advanced against the urging forces of the respective springs 40, 47.

Further, the concurrent movements of the movable core 45, the input member 28, and the front portion 271 establish an engagement of the front side of the input member 28 with the rear side of the reaction disc 48. This means that no clearance is defined between the reaction disc 48 and the input member 28.

Due to the fact that in normal temperatures the rubber member 281c of the first member 281 is easier to deform in the axial direct ion than in lower temperatures, after engagement between the reaction disc 48 and the input member 28, a further advancing movement of the movable core 45 becomes possible. Thus, such a further movement of each of the movable core 45 and the third input member 283 compresses the member 281c in the axial direction, which causes further advancing movements of the movable core 45 and the third input member 283.

At this time, the axial deformation amount of the rubber member 281c is defined as D1, and after the engagement of the first input member 281 with the reaction disc 48, the advance amount of each of the movable core 45 and the third input member 283 becomes equal to D1.

At this time, the actuator 41 issues the driving force whose magnitude is Fa1 which is equal to the input value Fi1, which means that the input member 28 is advanced in the frontward direction by a driving force Fa1. In other words, such a condition is equivalent to the application of an input force having a magnitude Fi1 (=Fa1) to the input member 28 by the driver.

The total amount of advancement of the third input member 283 relative to the power piston 22 from the initial position becomes (C+D1).

Advancing the third input member 283 by (C+D1) causes an engagement of the negative pressure seal portion 35b of the control valve 35 with the negative pressure valve seat 22b, thereby closing the negative pressure valve V2. Thus, an interruption is made between the vacuum passage 37 and the air passage 38, which isolates the second rear chamber 26 from the first front chamber 23. As a result, the valve mechanism 34 assumes the output maintaining mode. Moreover, the atmospheric pressure valve seat 28a of the input member 28 moves away from the atmospheric pressure sealing portion 35a of the control valve 35, which opens the atmospheric pressure valve V1, thereby establishing the output increasing mode of the valve mechanism 34. At this time, the amount of clearance between the atmospheric pressure valve seat 28a and the atmospheric pressure seal portion 35a is approximately equal to (C+D1−A).

In addition, the stationary core 44 and the movable core 45 are out of engagement with each other, thereby defining a clearance therebetween of (B−D1).

Upon establishment of the output increasing mode of the valve mechanism 34, atmospheric air flows into the rear chambers 24, 26 via the clearance between the atmospheric pressure valve seat 28a and the atmospheric pressure sealing portion 35a and the air passage 37, which increases the pressure in each of the rear chambers 24, 26, thereby producing the promoting force of each of the movable walls 17, 20 and the power piston 22.

Such promoting forces are transmitted from the power piston 22 to the output rod 49 via the stationary core 44 of the actuator 41 and the reaction disc 48, which causes unitary advancing movement of the movable walls 17, 20, the power piston 22, the actuator 41, the first input member 281, the third input member 283, and the output rod 49 relative to the housing 14, thereby activating the master cylinder 52.

At an initial stage of the advancing movement of the power piston 22, the second input member 282 of the input member 28 and the input rod 27 do not advance together with the power piston 22. However, when the power piston 22 advances by an amount relative to the second input member 282 and the key member 32, the rear portion of the air passage 38 of the power piston 22 is brought into engagement with the rear side of the key member 32 whose front side is in engagement with the front flange portion 282c of the second input member 282. This causes unitary movement of the second input member 282, the input rod 27, and the power piston 22.

After engagement of the power piston 22 with the key member 32 and the second input member 282, the input rod 27 is brought into unitary advancing movement with the power piston 22, which establishes a rotation of the brake pedal 80 in FIG. 1, although the brake pedal 80 is not depressed by the driver.

While the power piston 22 is in the process of advancing movement, the reaction disc 48 is compressed and the resultant or deformed reaction disc 48 under rearward extension extends into the guide member 46, whereby a transmission of the promoting force of each of the power piston 22 and the input member 28 is established from the reaction disc 48 to the output rod 49, and a reaction force corresponding to the output from the output rod 49 is applied to the input member 28 for retracting the input member 28 relative to the power piston 22.

Upon receiving the reaction force from the reaction disc 48, the first member 281, the movable core 45, and the third input member 283 are retracted against the driving force of the actuator 41 or the attraction force between the stationary core 44 and the movable core 45. Then, the atmospheric seal portion 35a of the control valve 35 is again brought into engagement with the atmospheric valve seat 28a, which causes an interruption of the fluid communication between the air passage 38 and the atmosphere. This stops the introduction of atmospheric pressure into both of the rear chambers 24, 26. Thus, the valve mechanism 34 is switched to the output maintaining mode.

At this time, the amount of rearward extension of the reaction disc 48 is equal to the distance amount (C+D1−A) between the atmospheric valve seat 28a and the atmospheric seal portion 35a.

In addition, at this time, the input member 28 is applied from the actuator 41 with the driving force whose magnitude is Fa1 which is equal to the input force whose magnitude is Fi1, which indicates that the unit 10 in normal operation is in equivalency with that of the unit 10 in the jumping operation at an input force whose magnitude is F11.

Thus, the output of the vacuum servo unit 10 which operates the "jumping operation" normally depends on the amount of rearward extension of the reaction disc 48 upon deformation thereof. The rearward extension amount (C+D1-A) of the reaction disc 48 when the actuator 41 is operated is larger than the rearward extension amount (C-A) of the reaction disc 48 during normal operation, which results in that the output when the actuator 41 is operated becomes larger than the output of the jumping operation when the vacuum servo unit 10 is in normal operation. That is, without an input from the driver, the output force Fo3, on the real line in FIG. 6, which is larger than the output force Fo1, is derived from the vacuum servo unit 10 to the master cylinder 52.

Upon receipt of the output force Fo3 from the vacuum servo unit 10, the piston of the master cylinder 52 is pushed, thereby supplying the brake fluid via the actuator division 54 to the wheel cylinders 55, 56, 57, 58 of the respective wheels FR, FL, RR, RL. Thus, each of the wheels FR, FL, RR, RL is applied with the braking force based on the output force Fo3 from the vacuum servo unit 10.

If a time duration is continued under which the output force Fo3 is derived from the vacuum servo unit 10 by applying a current whose magnitude is i1 to the solenoid coil 42, the electronic control device 50 increases the current magnitude to i2 from i1.

The resultant current increase establishes an increase in the attraction force between the movable core 45 and the stationary core 44, the driving force of the actuator 41 is increased from Fa1 to Fa2 (Fa1<Fa2≦Fi2), and it is no longer capable of maintaining the output maintaining mode of the valve mechanism 34 under which the reaction force from the reaction disc 48 is in balance with the driving force of the actuator 41.

That is, the movable core 45 is advanced relative to the power piston 22 against the reaction force from the reaction disc 48 under compression via the first input member 281, the urging force of the spring 91 via the third input member 283, and the reaction force from the rubber member 281c under compression. The resultant advancing movement of the movable core 45 causes advancing movements of the first input member 281 and the third input member 283, respectively.

Due to the advancing movement of the movable core 45, the rubber member 281c is brought into further compressed deformation and the resultant amount of axial compression of the rubber member 281c is D2.

The advancing movement of the third input member 283 of the input member 28 causes a movement of the atmospheric pressure valve seat 28a of the input member 28 away from the atmospheric pressure sealing portion 35a of the control valve 35. This opens the atmospheric valve V1, thereby establishing the output increasing mode of the valve mechanism 34.

In addition, the stationary core 44 and the movable core 45 are out of engagement with other, thereby defining a clearance in the amount of (B-D1-D2).

Under the resultant mode or the output increasing mode of the valve mechanism 34, atmospheric air is introduced into each of the rear chambers 24, 26 via the clearance between the seat 28a and the sealing portion 35a and the air passage 37. This causes an increase of pressure in each of the rear chambers 24, 26, thereby producing the respective promoting forces of the movable walls 17, 20 and the power piston 22.

Such promoting forces of the respective movable walls 17, 20 and the power piston 22 are transmitted from the power piston 22 to the output rod 49 via the stationary core 45 of the actuator 41 and the stationary disc 48, with unitary movement of the movable walls 17, 20, the power piston 22, the actuator 41, the input member 28, the front member 271 of the input rod 27, and the output rod 49 being established relative to the housing 14, thereby initiating the operation of the master cylinder 52.

During the advancing movement of the power piston 22 relative to the housing 14, the reaction disc 48 is compressed by the power piston 22 and the output rod 49, with the resultant reaction disc 48 rearwardly extending into the stationary core 44 or the guide member 46, and the resultant reaction disc 48 transmits the promoting forces of the power piston 22 and the input member 28 and provides a reaction force corresponding to the output of the output rod 49 to the input member 28 for the retraction thereof relative to the power piston 22.

The movable core 45, the first input member 281, and the third input member 283 are retracted by the force given from the reaction disc 48 against the attraction force between the stationary core 44 and the movable core 45 or the driving force of the actuator 41. Then, the atmospheric pressure sealing portion 35a of the control valve 35 is brought into re-engagement with the atmospheric pressure valve seat 28a, which interrupts the fluid communication between the air passage 39 and the atmosphere, thereby stopping the introduction of atmospheric pressure into each of the rear chambers 24, 26. Then, the valve mechanism 34 is switched to the output maintaining mode.

At this time, the amount of rearward extension of the reaction disc 48 is approximately equal to D2 which is the distance between the atmospheric pressure sealing portion 35a and the atmospheric pressure valve seat 28a.

Thus, when the electronic control device 50 turns on the actuator 41 by applying to the actuator 41 a current having a magnitude i2, the vacuum servo unit 10 issues a force Fo4 which is greater than Fo3 to the master cylinder 52. This means that the output force Fo4 is derived from the vacuum servo unit 10 without input from the driver.

Upon receiving the force Fo4 from the vacuum servo unit 10, the operation of the master cylinder 52 is initiated in such a manner that the piston is moved and the brake fluid under pressure is fed via the actuator division 54 to each of the wheel cylinders 55, 56, 57, 58 for the respective wheels FR, FL, RR, RL. Thus, wheels FR, FL, RR, RL are applied with the braking force depending on the output force Fo4 from the vacuum servo unit 10.

In other words, adjusting the amount of the current supplied to the solenoid coil 42 on which the driving force of the actuator 41 depends establishes a control of the output force of the vacuum servo unit 10.

While the vacuum servo unit 10 is in the automatic braking mode for inter-vehicle distance control, a stepwise increase of the output from Fo3 to Fo4 inclusive is made, which realizes a smooth increase of the braking force.

If the condition for deenergizing the solenoid coil 42 is satisfied, for example the sensor recognizes that the inter-vehicle distance returns to the set value, the results of the sensor cause the electronic control device 50 to bring the solenoid coil 42 into the deenergized condition.

Thus, the driving force Fa2 acting on the movable core 45, the first input member 281, and the third input member 283 disappears or is removed, which results in the movable core 45, the first member 281, and the third input member 283 returning to their respective initial positions by the spring 91.

The retracting movement of the third input member 283 causes a retraction of the movable portion 35c of the control valve 35 relative to the power piston 22, which moves the negative pressure valve sealing portion 35b away from the negative pressure valve seat 22a, thereby opening the negative pressure valve V2. Thus, the valve mechanism 34 is turned to the output decreasing mode.

Under such a separation state of the valve seat 22a from the sealing portion 35b, the vacuum passage 37 is brought into fluid communication with the air passage 38 via the clearance between the valve seat 22a and the sealing portion 35b, the pressures in the respective rear chambers 24, 26 decrease due to the fact that the rear chambers 24, 26 are connected to the vacuum source via the first front chamber 23.

Therefore, the pressure difference between the front chamber 23 (25) and the rear chamber 24 (26) is decreased and the resultant condition, in addition to the expanding force of the spring 51, causes retracting movements of the movable walls 17, 20 and the power piston 22 to their respective initial positions. Subsequently, the input member 28 and the front member 271 of the input rod 27 are also returned to the respective initial positions. Thus, the inter-vehicle distance control of the vacuum servo unit 10 is terminated.

Under a condition that the ambient temperature and/or the own temperature of each of the reaction disc 48 and the rubber member 281c is lower, at a time when, for example, the sensor detects that the inter-vehicle distance is shorter than a set value, the automatic operation mode of the vacuum servo unit 10 is established. That is, the actuator 41 is activated without movements of the brake pedal 80, the input rod 27, and the input member 28 associated with driver input.

In the electronic control device 10, if the solenoid coil 42 is applied with a current whose magnitude is i2, an electric attraction force is generated between the movable core 45 and the stationary core 44, which causes an advancing movement of each of the movable core 45 and the third input member 283 against the urging force of the spring 91 relative to the power piston 22 and the second input member 282. Along with the advancing movement of each of the movable core 45 and the third input member 283, the first input member 281 also advances because the engaging portion 281a is in engagement with the inward flange 45a of the movable core 45.

Advancing movement in an amount C of each of the movable core 45, the third input member 283, and the first input member 281 brings about an engagement of the front end of the first input member 281 with the rear end of the reaction disc 48, by which no clearance is defined or generated between the reaction disc 48 and the input member 28.

Under lower temperature conditions, the rubber member 281c of the first input member 281 hardly deforms in the axial direction, which causes a smaller advancement of each of the movable core 45 and the third input member 283 than that in normal temperature after engagement of the reaction disc 48 and the first input member 281. A further advancing movement of each of the movable core 45 and the third input member 283 compresses the rubber member 281c axially, which establishes additional further advancing movement of the movable core 45 and the third input member 283. Assuming that the magnitude of the axial deformation of the rubber member 281c is D3(<D1), the advance amount of each of the movable core 45 and the third input member 283 after engagement of the first input member 281 with the reaction disc 48 becomes equal to D3.

At this time, the driving force generated at the actuator 41 becomes Fa1 which is equal to the input force Fi1, which means that the input member 281 is advanced by being applied with the driving force whose magnitude is Fa1. Such a condition is substantially identical to that when the input member 28 is applied with a depressing force Fi1 (=Fa1).

In addition, as a result of the advancing movement of the movable core 45, the total amount of movement of the third input member 283 relative to the power piston 22 becomes substantially (C+D3) when measured from its initial position.

The advancing movement of the third input member 283 by (C+D3) brings the negative pressure seal portion 35b of the control valve 35 into engagement with the negative pressure valve seat 22b, which causes closure of the negative pressure valve V2. Then, fluid communication between the vacuum passage 37 and the air passage 38 ceases, which causes an interrupted condition between the first front chamber 23 and the second rear chamber 26, thereby establishing the output force maintaining condition. In addition, the atmospheric pressure valve seat 28a of the input member 28 is moved away from the atmospheric pressure seal portion 35a of the control valve 35, which causes opening of the atmospheric pressure valve V1, thereby establishing the output force increasing mode. At this time, the span of the clearance between the atmospheric pressure valve seat 28a and the atmospheric pressure seal portion 35a becomes (C+D3−A).

In addition, the stationary core 44 is out of engagement with the movable core 45 and a clearance is defined therebetween in the amount (B−D3).

Immediately upon establishment of the output force increasing mode, atmospheric air is introduced into both chambers 24, 26 by way of the clearance between the atmospheric pressure valve seat 28a and the atmospheric pressure seal portion 35a and the air passage 38. Thus, the pressure in each of the chambers 24, 26 increases, thereby generating a promoting or advancing force at each of the movable walls 17, 20 and the power piston 22.

The resultant promoting or advancing forces are transmitted to the output rod 49 by way of the stationary core 44 of the actuator 41 and the reaction disc 48. This causes, relative to the housing 14, a unitary advancing movement of the movable walls 17, 20, the power piston 22, the actuator 41, the first input member 281, the third input member 283, and the output rod 49, thereby actuating the master cylinder 52.

At an initial stage of the resultant movement of the power piston 22, the second input member 282 of the input member 28 and the input rod 27 do not move together with the power piston 22.

However, an amount of advancing movement of the power piston 22 relative to the second input member 282 and the key member 32 brings about an engagement between the rear portion of the air passage 38 of the power piston 22 and the rear side of the key member 32. Thereafter, the second input member 282 and the input rod 27 begin to move together with power piston 22 due to the fact that the front side of the key member 32 is in engagement with the front flange 282c of the second input member 282.

After establishment of this engagement, the input rod 27 is moved together with the power piston 22, which causes rotation of the brake pedal 80, though the brake pedal 80 is not depressed by the driver.

During advancing movement of the power piston 22 relative to the housing 14, the reaction disc 48 is deformed by being compressed by the power piston 22 and the output rod 49. Then, the reaction disc 48 is deformed and extends rearwardly, with the rearward extension moving into the central hole of the guide member 46, thereby transmitting the promoting forces of the power piston 22 and the input member 28 to the output rod 49. Concurrently, the resultant reaction disc 48 also transmits the reaction force from the output rod 49 to the first input member 281, the movable core 45, and the third input member 283 in order to retract these members relative to the power piston 22 and the second input member 282.

When the first input member 281, the movable core 45, and the third input member 283 receive the reaction force from the reaction disc 48, these members 281, 45, 283 retract against the attraction force between the stationary core 44 and the movable core 45 which is caused by activating the solenoid coil 42 and which is also the driving force issued from the actuator 41. Ultimately, the atmospheric pressure seal portion 35a of the control valve 35 is brought into re-engagement with the atmospheric pressure valve seat 28a. Then, fluid communication between the air passage 38 and the atmosphere is interrupted, which stops the introduction of atmospheric pressure into both rear chambers 24, 26, which switches the valve mechanism 34 to its output force maintaining mode.

At this time, the amount of the reward extension of the reaction disc 48 is substantially equal to the separation amount between the atmospheric pressure seal portion 35a of the control valve 35 and the atmospheric pressure valve seat 28a.

In addition, at this time, the input member 28 is applied with the driving force Fa1 from the actuator 41 which is equal to the input force Fi1, which is equivalent to the jumping operation of the vacuum servo unit 10, while in its normal brake operation mode, which is in receipt of an input force Fi1.

Thus, the output force during jumping operation depends on the rearward extension amount of the reaction disc 48. The rearward extension amount (C+D3−A) of the reaction disc 48 while the actuator 41 is activated is larger than the rearward extension amount (C−A) of the reaction disc 48 while the vacuum servo unit 10 is in its normal brake operation mode under lower temperature, which indicates that the output force when the actuator 41 is activated becomes larger than the jumping operation output in normal brake operation.

On the other hand, the jumping operation output depends on the temperature of the reaction disc 48 itself, and as can be understood from FIG. 6 the jumping operation output in a lower temperature is larger than in a normal temperature. However, in the vacuum servo unit 10 according to the present embodiment, an axial span between the atmospheric pressure valve seat 28a and the front end of the first input member 281 as the engaging portion with the reaction disc 48 when the automatic braking operation mode with current i1 is set to be longer by (D1−D3) at lower temperatures than at normal temperatures, which can compensate the possible insufficient or short rearward extension amount of the reaction disc 48 at lower temperatures.

Thus, the output force of the unit 10 when its automatic operation mode with current i1 at lower temperatures can be closely approximated to Fo3 which is the output force of the unit 10 at normal temperatures. That is, the variation of the input-output performance or characteristic of the vacuum servo unit 10 caused by temperature differences is reduced and becomes as small as possible.

Assuming that the insufficient or short rearward extension amount is (D1−D3) when the unit 10 is in its automatic operation mode with current i1 at lower temperatures, the temperature difference of the axial length of the input member 28 becomes (D1−D3), by which the output value of the vacuum servo unit 10 at lower temperatures can be close to or equal to Fo3 which is the output value at normal temperatures.

That is, the output force whose magnitude is Fo5 in one-dot chain line in FIG. 6 is applied to the master cylinder 52, i.e., the output value Fo5 is obtained without the driver's depression on the brake pedal 80.

Upon receipt of the output force having the magnitude Fo5 from the vacuum servo unit or booster 10, the piston of the master cylinder 52 is urged, thereby discharging therefrom a brake fluid under pressure to the wheel cylinders 55, 56, 57, 58 of the respective road-wheels FR, FL, RR, RL. Thus, a braking force corresponding to the output value Fo5 of the vacuum servo unit or booster 10 is applied to each of the road-wheels FR, FL, RR, RL.

If the vacuum servo unit or booster 10 is driven to issue the output value Fo5 for a fixed time duration by applying a current whose magnitude is i1 to the solenoid coil 42, the electronic control device 50 begins to increase the magnitude of the current applied to the solenoid coil 42 to i2 from i1.

When the electronic control device 50 controls the solenoid coil 42 by applying the current thereto whose magnitude is i2, the attraction force between the movable core 45 and the stationary core 44 is increased, which increases the driving force of the actuator 41 from the value Fa1 to a value Fa2 which is not less than Fa1 and not greater than Fi2 (Fa1≦Fa2≦Fi2), thereby stopping the output force maintaining mode of the valve mechanism 34 under which the reaction force from the reaction disc 48 and the driving force from the actuator 41 are in balance.

More specifically, the movable core 45 is brought into advancing movement relative to the power piston 22 which is established by resisting the reaction force from the reaction disc 48 via the first input member 281, the urging force of the spring 91 via the third input member 283, and the restoring force of the compressed rubber member 281c. As a result, the first input member 281 and the third input member 283 are advanced relative to the power piston 22.

The advancing movement of the movable core 45 compresses further the rubber member 281c and the resultant or compressed amount becomes D4 (<D2). At this time, the driving force generated at the actuator 41 becomes Fa2, which means that the movable core 45, the first input member 281, and the third input member 283 are advanced by being applied with the driving force whose magnitude is Fa2. Such a condition is substantially identical to that which the input member 28 is applied with a depressing force Fa2.

The advancing movement of the third input member 283 moves the atmospheric pressure valve seat 28a of the input member 28 away from the atmospheric pressure seal portion 35a of the control valve 35, which causes opening of the atmospheric pressure valve V1, thereby establishing the output force increasing mode of the valve mechanism 34.

In addition, the stationary core 44 is out of engagement with the movable core 45 and a clearance is defined therebetween in the amount (B−D3−D4).

Immediately upon establishment of the output force increasing mode, atmospheric air is introduced into both chambers 24, 26 by way of the clearance between the atmospheric pressure valve seat 28a and the atmospheric pressure seal portion 35a and the air passage 38. Thus, the pressure in each of the chambers 24, 26 increases, thereby generating a prompting or advancing force at each of the movable walls 17, 20 and the power piston 22.

The resultant prompting forces are transmitted to the output rod 49 by way of the stationary core 44 of the actuator 41 and the reaction disc 48. This causes, relative to the housing 14, a unitary advancing movement of the movable walls 17, 20, the power piston 22, the actuator 41, the input member 28, the front portion 271 of the input rod 27 and the output rod 49, thereby actuating the master cylinder 52.

During advancing movement of the power piston 22 relative to the housing 14, the reaction disc 48 is deformed by being compressed by the power piston 22 and the output rod 49. Then, the reaction disc 48 becomes rearwardly extended and moves into the central hole of the guide member 46, thereby transmitting the promoting forces of the power piston 22 and the input member 28 to the output rod 49. Concurrently, the resultant reaction disc 48 also transmits the reaction force from the output rod 49 to the first input member 281, the movable core 45, and the third input member 283 to retract these members relative to the power piston 22.

When the first input member 281, the movable care 45, and the third input member 283 receive the reaction force from the reaction disc 48, these members 281, 45, 283 are retracted against the attraction force between the stationary core 44 and the movable core 45 which is caused by activation of the solenoid coil 42 and which is the driving force issued from the actuator 41. Ultimately, the atmospheric pressure seal portion 35a of the control valve 35 is brought into re-engagement with the atmospheric pressure valve seat 28a. Then, the fluid communication between the air passage 38 and the atmosphere is interrupted, which stops the introduction of atmospheric pressure into both rear chambers 24, 26, which switches the valve mechanism 34 to its output force maintaining mode.

When the actuator 41 is turned on by applying a current whose magnitude is i2 from the electronic control device 50 to the solenoid coil 42, the vacuum servo unit or booster 10 issues an output force whose magnitude is Fo6 to the master cylinder 52. In brief, without the driver's depression, the vacuum servo unit or booster 10 issues such an output force.

At normal temperatures, if the driver, for example, depresses the brake pedal 90 suddenly for emergency braking at an input force of Fi3, the input rod 27 and the input member 28 are advanced relative to the power piston 22.

Like the foregoing normal braking operation, the valve mechanism 34 is switched from the output force decreasing mode to the output increasing mode, and thereafter when the reaction force is applied from the reaction disc 48 to the input member 28 the valve mechanism 34 is turned to the output force maintaining mode from the output force increasing mode, resulting in an output force Fo7 as indicated in FIG. 5.

On the other hand, if such a depression of the brake pedal 80 is found to be an emergency braking operation by, for example, a depression speed sensor (not shown), the electronic control device 50 begins to apply a current whose magnitude is, for example i1, to the solenoid coil 42.

When the solenoid coil 42 is activated by being applied with such a current, an electromagnetic attraction force is generated between the movable core 45 and the stationary core 45, thereby stopping the output force maintaining mode of the valve mechanism 34 under which the reaction force from the reaction disc 48 and the depression force from the brake pedal 80 are in balance.

More specifically, the movable core 45 is brought into advancing movement relative to the power piston 22 which is established by resisting the reaction force from the reaction disc 48 via the first input member 281, the urging force of the spring 91 via the third input member 283, and the restoring force of the compressed rubber member 281c. As a result, the first input member 281 and the third input member 283 are advanced relative to the power piston 22.

The advancing movement of the movable core 45 further compresses the rubber member 281c and the resultant or compressed amount becomes D1.

The advancing movement of the third input member 283 moves the atmospheric pressure valve seat 28a of the input member 28 by D1 away from the atmospheric pressure seal portion 35a of the control valve 35, which causes opening of the atmospheric pressure valve V1, thereby establishing the output force increasing mode of the valve mechanism 34.

In addition, the stationary core 44 is out of engagement with the movable core 45 and a clearance is defined therebetween in the amount of (B–D1).

Immediately upon establishment of the output force increasing mode of the valve mechanism 34, atmospheric air is introduced into both chambers 24, 26 by way of the clearance between the atmospheric pressure valve seat 28a and the atmospheric pressure seal portion 35a and the air passage 38. Thus, the pressure in each of the chambers 24 26 increases, thereby generating promoting or advancing forces at each of the movable walls 17, 20 and the power piston 22.

The resultant promoting forces are transmitted to the output rod 49 by way of the stationary core 44 of the actuator 41 and the reaction disc 48, which causes, relative to the housing 14, a unitary advancing movement of the movable walls 17, 20, the power piston 22, the actuator 41, the input member 28, the front portion 271 of the input rod 27 and the output rod 49, thereby actuating the master cylinder 52.

During advancing movement of the power piston 22 relative to the housing 14, the reaction disc 48 is deformed by being compressed by the power piston 22 and the output rod 49. Then, the reaction disc 48 is deformed and rearwardly extended, which moves into the central hole of the guide member 46, thereby transmitting the promoting forces of the power piston 22 and the input member 28 to the output rod 49. Concurrently, the resultant reaction disc 48 also transmits the reaction force from the output rod 49 to the first input member 281, the movable core 45, and the third input member 283 to retract these members relative to the power piston 22.

When the first input member 281, the movable core 45, and the third input member 283 receive the reaction force from the reaction disc 48, these members 281, 45, and 283 are retracted against the attraction force between the stationary core 44 and the movable core 45 which is caused by activating the solenoid coil 42 and which is also the driving force issued from the actuator 41. Ultimately, the atmospheric pressure seal portion 35a of the control valve 35 is brought into re-engagement with the atmospheric pressure valve seat 28a. Then, fluid communication between the air passage 38 and the atmosphere is interrupted, which stops the introduction of atmospheric pressure into both rear chambers 24, 26, which switches the valve mechanism 34 to its output force maintaining mode.

At this time, the rearward extension amount of the reaction disc 48 is equal to D1 which is the amount of the clearance between the atmospheric pressure seal portion 35a of the control valve 35 and the atmospheric pressure valve seat 28a.

Thus, when the actuator 41 is turned on by applying a current whose magnitude is i2 from the electronic control device 50 to the solenoid coil 42, the vacuum servo unit or booster 10 issues an output force to the master cylinder 52 whose magnitude is Fo8 which is greater than Fo7. In brief, the vacuum servo unit or booster 10 issues such an output force whose magnitude is Fo8 which is greater than the output value Fo7 which is issued from the unit 10 in normal operation when the driver depresses the brake pedal 80 at an input force of Fi3.

As can be appreciated from the foregoing description, the vacuum servo unit 10 in accordance with the present embodiment provides a variety of advantages.

Controlling the amount of current to be applied to the solenoid coil 42 of the actuator 41 makes it possible to adjust the attraction force between the movable core 45 and the stationary core 44 or the driving force issued from the actuator 41, which causes a variable output force from the output rod 49, thereby establishing precise braking operation in view of circumstances.

Providing the rubber member 281c at a position between the first input member 281 and the movable core 45 results in the variable amount of deformation of the rubber member 281c which depends on the driving force issued from the actuator 41, thereby enabling simplification of the unit 10 at a lower cost and easy assembly.

The portion at which the rubber member 281c is positioned is located at the front portion of the power piston 22 which is not narrow in space. Thus, such a positioning of the rubber member 281c can be made without changing the arrangement of the neighboring members, thereby attaining simplification in structure of the vacuum servo unit 10.

Even though the reaction disc 48 becomes harder and its elasticity becomes smaller due to the lowering of the ambient temperature and the resulting lowering of the temperature of the reaction disc 48 itself, the resultant insufficient or reduced deformation amount of the reaction disc 48 can be compensated for by the structure, wherein the distance between the front end of the reaction disc 48 and the atmospheric pressure valve seat 28a is set to be longer at lower temperatures than at normal temperatures. Thus, particularly when the unit 10 issues the output force by operating the actuator 41 without the driver depressing the brake pedal 80 such as in the automatic brake operation mode for inter-vehicle distance control, the output force at lower temperatures can be approximated to that at normal temperatures.

The rubber member 281c serves for controlling the output function when the actuator 41 is driven and for establishing that the difference between the input-output characteristics in lower temperatures and the input-output characteristics in normal temperatures is as small as possible. Thus, the number of parts need not be increased, thereby attaining simplification of the unit 10 and easy assembly of the unit 10.

The fluid-tight connection between the third input member 283 and the second input member 282 is established by the diaphragm 284, which enables smooth movement of the third input member 283 toward the second input member 282 during operation of the actuator 41, thereby lessening the amount of the current to be applied to the solenoid coil 42 of the actuator 41.

In addition, the braking force produced from the unit 10 can be varied in a linear mode and the driver's intention can be also can be accurately reflected upon braking operation.

It is to be understood that although the embodiment described above relates to a tandem type unit 10, the present invention is also applicable to a single type vacuum servo unit. Also, the automatic adjusting output force function can be provided for other than the inter-vehicle distance control and emergency braking operation.

The reaction member and the compressible member 281c are made of a material having a substantial degree of deformation in accordance with the present invention. So long as the rubber member 281c is brought into deformation by the actuation of the actuator 41, any deformation mode of the rubber member 281c is acceptable and can be employed. The raw material from which the rubber member 281c and the reaction disc 48 is fabricated can be varied and different from that described above, subject to the substance being of a thermal responsive variable deformation nature.

The principles, preferred embodiment and mode of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims be embraced thereby.

What is claimed is:

1. A vacuum servo unit for vehicle brake systems comprising:

a housing in which is defined at least one pressure space;

a movable wall provided in the housing for movement in an axial direction, the movable wall dividing the pressure space into first and second chambers;

a power piston coupled to the movable wall;

an axially movable input member located in the power piston and connectable to a brake operation member to be moved upon application of an input force to the brake operation member, the input member including a front portion having an engaging portion and a rear portion positioned at a rear side of the front portion, the front portion being movable back and forth relative to the rear portion;

a valve mechanism located in the power piston and connected to the input member to control pressure within one of said first and second chambers to cause said movable wall to move and thereby apply an advancing force to the power piston, the valve mechanism including an atmospheric pressure valve seat and an atmospheric pressure seal portion that are adapted to engage one another, the atmospheric pressure valve seat being operatively connected to the input member to operate the valve mechanism by the input member;

an output member outputting the advancing force applied to the power piston outside the housing;

a deformable reaction member transmitting the advancing force of the power piston and the input force applied to the input member to the output member, the reaction member providing a reaction force to retract the input member;

an actuator connected to the valve mechanism to operate the valve mechanism upon operation of the actuator in a manner causing application of the advancing force to the power piston;

a compressible member located between the front portion of the input member and the movable member of the actuator to be axially compressed during operation of the actuator; and the engaging portion of the input member directly engaging the reaction member, an axial distance between the engaging portion of the input member and the atmospheric pressure valve seat during operation of the actuator continuously varying in response to continuous changing of a driving force applied to the movable member upon activating the actuator.

2. The vacuum servo unit as set forth in claim 1, wherein the reaction member and the compressible member are made of rubber.

3. The vacuum servo unit as set forth in claim 1, wherein the front portion of the input member constitutes a first member and the rear portion of the input member constitutes a second member to be connected to the brake operation member, the input member including a third member positioned rearward of the second member and connected to the atmospheric pressure valve seat, the third member is movable forth and back relative to the second member, the second member and third member or the input member being connected by a flexible diaphragm.

4. The vacuum servo unit as set forth in claim 1, wherein the reaction member is deformed elastically in a rearward direction, with a magnitude of the deformation of the reaction member varying with temperature, a degree of deformation of the compressible member varying with temperature.

5. The vacuum servo unit as set forth in claim 1, wherein the actuator is connected to a power supply and includes a solenoid coil which attracts the movable member upon receipt of electric power from the power supply.

6. A vacuum servo unit for vehicle brake systems comprising:

a housing in which is defined at least one pressure space;

a movable wall provided in the housing for movement in an axial direction, the movable wall dividing the pressure space into front and rear chambers;

a power piston coupled to the movable wall for producing an advancing force;

an axially movable input member located in the power piston that is movable when an input force is applied by a brake operation member, the input member including a front portion having an engaging portion and a rear portion positioned at a rear side of the front portion, the front portion being movable back and forth relative to the rear portion;

an atmospheric pressure valve seat movable together with the input member in a frontward direction upon application of the input force to the input member;

a negative pressure valve seat formed in the power piston;

a control valve including an atmospheric pressure seal portion and a negative pressure seal portion, the atmospheric pressure seal portion interrupting fluid communication between the atmosphere and the rear chamber upon engagement with the atmospheric pressure valve seat and establishing fluid communication between the atmosphere and the rear chamber upon disengagement with the atmospheric pressure valve seat, the negative pressure seal portion interrupting fluid communication between the negative pressure source and the rear chamber upon engagement with the negative pressure valve seat and establishing fluid communication between the negative pressure source and the rear chamber upon disengagement with the negative pressure valve seat;

an output member outputting the advancing force outside the housing upon being advanced by the power piston;

a deformable reaction member transmitting the advancing force of the power piston and the input force applied to the input member to the output member, the reaction member providing a reaction force to retract the input member;

an actuator providing the advancing force to the power piston by disengaging the atmospheric pressure valve seat from the atmospheric pressure seal portion to cause introduction of atmospheric pressure into the rear chamber, the actuator including a movable member connected to the atmospheric valve seat to move the atmospheric pressure valve seat in the frontward direction upon activation of the actuator, a compressible member located between the front portion of the input member and the movable member of the actuator to be axially compressed during operation of the actuator, and the engaging portion of the input member directly engaging the reaction member, an axial distance between the engaging portion of the input member and the atmospheric pressure valve seat during operation of the actuator continuously varying in response to a continuously changing driving force applied to the movable member upon activating the actuator.

7. The vacuum servo unit as set forth in claim 6, wherein the reaction member and the compressible member are made of rubber.

8. The vacuum servo unit as set forth in claim 6, wherein the front portion of the input member constitutes a first member and the rear portion of the input member constitutes a second member adapted to be connected to the brake operation member, the input member including a third member positioned rearward of the second member and connected to the atmospheric pressure valve seat, the third member being movable back and forth relative to the second member, the second member and the third member of the input member being connected by a flexible diaphragm.

9. The vacuum servo unit as set forth in claim 6, wherein the reaction member is deformed elastically in a rearward direction, with a magnitude of the deformation of the reaction member varying with temperature, a degree of deformation of the compressible member varying with temperature.

10. The vacuum servo unit as set forth in claim 6, wherein the actuator is connected to a power supply and includes a solenoid coil which attracts the movable member upon receipt of electric power from the power supply.

11. A vacuum servo unit for vehicle brake systems comprising:

a housing in which is defined at least one pressure space;

a movable wall provided in the housing for movement in an axial direction, the movable wall dividing the pressure space into first and second chambers;

a power piston coupled to the movable wall;

an axially movable input member located in the power piston and connectable to a brake operation member to be moved upon application of an input force to the brake operation member, the input member including relatively movable first and second members, the second member being positioned at a rear side of the first member;

a valve mechanism located in the power piston to control pressure within one of said first and second chambers to cause said movable wall to move and thereby apply an advancing force to the power piston;

an output member outputting the advancing force applied to the power piston outside the housing;

a deformable reaction member transmitting the advancing force of the power piston and the input force applied to the input member to the output member, the reaction member providing a reaction force to retract the input member;

an actuator connected to the valve mechanism to operate the valve mechanism upon operation of the actuator in a manner causing application of the advancing force to the power piston; and a compressible member located within the power piston and positioned between the first member of the input member and a movable portion of the actuator, the compressible member being compressed during operation of the actuator.

12. The vacuum servo unit as set forth in claim 11, wherein the actuator is positioned within the power piston and the movable portion of the actuator engages the valve mechanism.

13. The vacuum servo unit as set forth in claim 11, wherein the valve mechanism includes an atmospheric pressure valve seat that is adapted to engage an atmospheric pressure seal portion, said input member having an engaging portion for directly engaging the reaction member, a distance between said engaging portion and the atmospheric pressure valve seat varying depending on the driving force of the actuator.

14. The vacuum servo unit as set forth in claim 11, wherein the actuator is positioned within the power piston and the movable portion of the actuator engages the valve mechanism, the actuator including a solenoid coil connectable to a power supply to attract the movable portion upon receipt of electric power from the power supply.

15. The vacuum servo unit as set forth in claim 11, wherein the input member includes a third member positioned rearward of the second member, said second and third members being connected by a flexible diaphragm.

* * * * *